US011137495B2

(12) United States Patent
Caspall

(10) Patent No.: US 11,137,495 B2
(45) Date of Patent: Oct. 5, 2021

(54) ANGULAR OFFSET TRANSDUCERS IN MULTIPLE TRANSDUCER SONAR SYSTEM

(71) Applicant: NAVICO HOLDING AS, Egersund (NO)

(72) Inventor: Jayme J. Caspall, Tulsa, OK (US)

(73) Assignee: NAVICO HOLDING AS, Egersund (NO)

(*) Notice: Subject to any disclaimer, the term of this patent is extended or adjusted under 35 U.S.C. 154(b) by 385 days.

(21) Appl. No.: 16/144,367

(22) Filed: Sep. 27, 2018

(65) Prior Publication Data
US 2020/0103524 A1 Apr. 2, 2020

(51) Int. Cl.
G01S 15/89 (2006.01)
G01S 7/62 (2006.01)
G01S 15/87 (2006.01)

(52) U.S. Cl.
CPC ........ *G01S 15/8902* (2013.01); *G01S 7/6281* (2013.01); *G01S 15/87* (2013.01)

(58) Field of Classification Search
None
See application file for complete search history.

(56) References Cited

U.S. PATENT DOCUMENTS

| 3,614,722 A | * | 10/1971 | Jones | G01S 15/87 367/123 |
| 4,970,700 A | * | 11/1990 | Gilmour | G01S 15/8902 367/88 |
| 5,297,109 A | * | 3/1994 | Barksdale, Jr. | E02B 17/0034 367/104 |
| 5,525,081 A | * | 6/1996 | Mardesich | B63H 20/007 114/144 E |
| 6,778,468 B1 | * | 8/2004 | Nishimori | G01S 7/52003 367/103 |

(Continued)

FOREIGN PATENT DOCUMENTS

WO WO 2008/152618 12/2008

OTHER PUBLICATIONS

Imagenex Technology Corp. "Sonar Theory and Applications; Excerpt from Imagenex Model 855 Color Imaging Sonar User's Manual"; Canada; 8 pages.

*Primary Examiner* — Isam A Alsomiri
*Assistant Examiner* — Vikas Atmakuri
(74) *Attorney, Agent, or Firm* — Nelson Mullins Riley & Scarborough LLP

(57) ABSTRACT

Example sonar transducer assemblies configured for reduced interference are provided herein. An example sonar transducer assembly includes a housing, a first transducer, and a second transducer. The first transducer is positioned within the housing such that a length is configured to extend in a first mounting plane and a produced first beam defining a fan-shape extends in a first plane. The second transducer is positioned at a tilted angle within the housing such that a length is configured to extend in a second mounting plane and a produced second beam defining a fan-shape is in a second plane. The second mounting plane is non-parallel to the first mounting plane and is offset from the first mounting plane by at least 1 degree such that the second plane is not parallel to the first plane so as to reduce interference between the first transducer and the second transducer.

18 Claims, 12 Drawing Sheets

(56) References Cited

U.S. PATENT DOCUMENTS

| | | | | |
|---|---|---|---|---|
| 8,514,658 | B2* | 8/2013 | Maguire | G01S 15/89 367/88 |
| 9,268,020 | B2* | 2/2016 | Coleman | G01S 15/003 |
| 9,335,412 | B2* | 5/2016 | Proctor | G01S 7/56 |
| 10,024,961 | B2* | 7/2018 | Coleman | G01S 7/52 |
| 2004/0168517 | A1* | 9/2004 | Dufait | G01S 15/8925 73/626 |
| 2005/0007882 | A1* | 1/2005 | Bachelor | G01S 15/89 367/103 |
| 2011/0013485 | A1* | 1/2011 | Maguire | G01S 15/89 367/88 |
| 2012/0106300 | A1* | 5/2012 | Maguire | G01S 7/56 367/153 |
| 2014/0269192 | A1* | 9/2014 | Proctor | G01S 15/89 367/88 |
| 2015/0294660 | A1* | 10/2015 | Stokes | G01S 15/86 367/173 |
| 2015/0369908 | A1* | 12/2015 | Zimmerman | G01S 15/96 367/7 |
| 2017/0090021 | A1* | 3/2017 | Sayer | G01S 15/88 |
| 2017/0115389 | A1* | 4/2017 | Maguire | G01S 7/56 |
| 2017/0139044 | A1* | 5/2017 | Laster | G01S 7/6281 |
| 2017/0219703 | A1* | 8/2017 | Proctor | G01S 15/876 |

* cited by examiner

ANGULAR OFFSET TRANSDUCERS IN MULTIPLE TRANSDUCER SONAR SYSTEM

FIELD OF THE INVENTION

Embodiments of the present invention relate generally to sonar systems and, more particularly, to sonar systems, assemblies, and associated methods that utilize multiple transducers.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. Sonar beams from a transducer assembly can be transmitted into the underwater environment. The sonar signals reflect off objects in the underwater environment (e.g., fish, structure, sea floor bottom, etc.) and return to the transducer assembly, which converts the sonar returns into sonar data that can be used to produce an image of the underwater environment.

Some sonar transducer assemblies utilize multiple transducers and may provide different image options based on the different received sonar data. In some cases, however, portions of the sonar beams projected from each of the multiple transducers may overlap with each other and cause interference that can result in lower quality images and/or require additional filtering/processing. Applicant has developed systems and methods detailed herein to improve the sonar process and the resulting sonar images.

BRIEF SUMMARY OF THE INVENTION

Some embodiments of the present invention contemplate utilizing tilted mounting of one or more transducers within a transducer assembly to help reduce interference from the various sonar beams being emitted. In this regard, some sonar transducer assemblies may utilize two or more transducers. Depending on the shape of the emitting face of the transducer and their relative position, if the transducers are mounted proximate each other and in parallel, then portions of the corresponding sonar beams may overlap—sometimes significantly. For example, if linear transducers are used (e.g., the transducer as a rectangular emitting face), then corresponding fan-shaped beams may be emitted into the underwater environment. If the sonar transducer assembly utilizes one such linear transducer for sidescan image generation and another such linear transducer for downscan image generation—then their resulting sonar beams may overlap—as they are mounted in parallel alignment. Such overlap can provide interference that results in one or more of the images being reduced in quality. In order to reduce that interference, some embodiments of the present invention contemplate tilting one or more of the transducer elements within the transducer housing such that the resulting sonar beams are in different (non-parallel) planes. In some cases, the tilt may still enable intersection of the sonar beams, such as at the center point below the watercraft or trolling motor. Notably, such a mounting configuration has been shown to have benefits at certain frequency operation ranges for the linear transducer elements.

In an example embodiment, a sonar transducer assembly for reduced interference is provided. The sonar transducer assembly comprising a housing configured to be mounted to a watercraft or a trolling motor. The sonar transducer assembly includes a first transducer positioned within the housing and aimed generally downward of the watercraft or the trolling motor when the housing is mounted to the watercraft or the trolling motor. The first transducer defines a rectangular emitting face with a length and a width. The first transducer is positioned within the housing such that the length is configured to extend parallel to a centerline plane corresponding to the centerline of the watercraft or the trolling motor. The first transducer is configured to produce a first beam defining a fan-shape and generally extending in a first plane. The sonar transducer assembly includes a second transducer positioned within the housing and aimed generally downwardly and to a side of the watercraft or the trolling motor when the housing is mounted to the watercraft or the trolling motor. The second transducer defines a rectangular emitting face with a length and a width. The second transducer is configured to produce a second beam defining a fan-shape and generally extending in a second plane. The second transducer is positioned at a tilted angle within the housing such that the length is configured to extend in a mounting plane that is non-parallel to the centerline plane. The mounting plane is offset from the centerline plane by at least 1 degree such that the second plane is not parallel to the first plane so as to reduce interference between the first transducer and the second transducer.

In some embodiments, the second plane and the first plane intersect. In some embodiments, the second plane and the first plane intersect at the centerline plane.

In some embodiments, the second plane is at a non-perpendicular angle with respect to the centerline plane.

In some embodiments, a width of the first beam extends to the left and to the right of the centerline plane, and at least a portion of a width of the second beam extends across the centerline plane.

In some embodiments, the tilted angle is between 2 degrees and 4 degrees of offset from the centerline plane.

In some embodiments, the first transducer is configured to emit one or more first beams into an underwater environment, receive first sonar returns from the underwater environment, and convert the first sonar returns into first sonar return data that is used to form a downscan image of the underwater environment. In some embodiments, the second transducer is configured to emit one or more second beams into the underwater environment, receive second sonar returns from the underwater environment, and convert the second sonar returns into second sonar return data that is used to form a sidescan image of the underwater environment.

In some embodiments, the side of the watercraft or the trolling motor is a first side. The sonar transducer assembly further comprises a third transducer positioned within the housing and aimed generally downwardly and to a second side of the watercraft or the trolling motor when the housing is mounted to the watercraft or the trolling motor. The second side is opposite the first side. The third transducer defines a rectangular emitting face with a length and a width. The third transducer is configured to produce a third beam defining a fan-shape and generally extending in a third plane. The third transducer is positioned at a second tilted angle within the housing such that the length is configured to extend in a second mounting plane that is non-parallel to the centerline plane. The second mounting plane is offset from the centerline plane by at least 1 degree such that the third plane is not parallel to the first plane so as to reduce interference between the first transducer and the third transducer. In some embodiments, the mounting plane corresponding to the first transducer is a first mounting plane, and the second mounting plane is non-parallel to the first mounting plane. In some embodiments, the second tilted angle corresponding to the second mounting plane is offset from the centerline plane a same degree as the tilted angle corresponding to the first mounting plane such that the third plane and the second plane are symmetrical with respect to the centerline plane.

In another example embodiment, a sonar transducer assembly for reduced interference is provided. The sonar transducer assembly comprises a housing configured to be mounted to a watercraft or a trolling motor. The sonar transducer assembly includes a first transducer positioned within the housing and aimed generally downwardly and to a side of the watercraft or the trolling motor when the housing is mounted to the watercraft or the trolling motor. The first transducer defines a rectangular emitting face with a length and a width. The first transducer is positioned within the housing such that the length is configured to extend parallel to a centerline plane corresponding to the centerline of the watercraft or the trolling motor. The first transducer is configured to produce a first beam defining a fan-shape and generally extending in a first plane. The sonar transducer assembly further includes a second transducer positioned within the housing and aimed generally downward of the watercraft or the trolling motor when the housing is mounted to the watercraft or the trolling motor. The second transducer defines a rectangular emitting face with a length and a width. The second transducer is configured to produce a second beam defining a fan-shape and generally extending in a second plane. The second transducer is positioned at a tilted angle within the housing such that the length is configured to extend in a mounting plane that is non-parallel to the centerline plane. The mounting plane is offset from the centerline plane by at least 1 degree such that the second plane is not parallel to the first plane so as to reduce interference between the first transducer and the second transducer.

In some embodiments, the second plane and the first plane intersect. In some embodiments, the second plane and the first plane intersect at the centerline plane.

In some embodiments, the second plane is at a non-perpendicular angle with respect to the centerline plane.

In yet another example embodiment, a sonar transducer assembly for reduced interference is provided. The sonar transducer assembly comprises a housing configured to be mounted to a watercraft or a trolling motor. The sonar transducer assembly includes a first transducer positioned within the housing and aimed generally downward of the watercraft or the trolling motor when the housing is mounted to the watercraft or the trolling motor. The first transducer defines a rectangular emitting face with a length and a width. The first transducer is positioned within the housing such that the length is configured to extend in a first mounting plane. The first transducer is configured to produce a first beam defining a fan-shape and generally extending in a first plane. The sonar transducer assembly further includes a second transducer positioned within the housing and aimed generally downwardly and to a side of the watercraft or the trolling motor when the housing is mounted to the watercraft or the trolling motor. The second transducer defines a rectangular emitting face with a length and a width. The second transducer is configured to produce a second beam defining a fan-shape and generally extending in a second plane. The second transducer is positioned at a tilted angle within the housing such that the length is configured to extend in a second mounting plane that is non-parallel to the first mounting plane. The second mounting plane is offset from the first mounting plane by at least 1 degree such that the second plane is not parallel to the first plane so as to reduce interference between the first transducer and the second transducer.

In some embodiments, the second plane and the first plane intersect at a centerline plane corresponding to a centerline of the watercraft or the trolling motor.

In yet another example embodiment, a sonar system for reduced interference for imaging an underwater environment is provided. The sonar system comprises a sonar transducer assembly comprising a housing configured to be mounted to a watercraft or a trolling motor. The sonar transducer assembly includes a first transducer positioned within the housing and aimed generally downward of the watercraft or the trolling motor when the housing is mounted to the watercraft or the trolling motor. The first transducer defines a rectangular emitting face with a length and a width. The first transducer is positioned within the housing such that the length is configured to extend parallel to a centerline plane corresponding to the centerline of the watercraft or the trolling motor. The first transducer is configured to produce a first beam defining a fan-shape and generally extending in a first plane. The first transducer is configured to emit one or more first beams into the underwater environment, receive first sonar returns from the underwater environment, and convert the first sonar returns into first sonar return data that is used to form a downscan image of the underwater environment. The sonar transducer assembly further includes a second transducer positioned within the housing and aimed generally downwardly and to a side of the watercraft or the trolling motor when the housing is mounted to the watercraft or the trolling motor. The second transducer defines a rectangular emitting face with a length and a width. The second transducer is configured to produce a second beam defining a fan-shape and generally extending in a second plane. The second transducer is positioned at a tilted angle within the housing such that the length is configured to extend in a mounting plane that is non-parallel to the centerline plane. The mounting plane is offset from the centerline plane by at least 1 degree such that the second plane is not parallel to the first plane so as to reduce interference between the first transducer and the second transducer. The second transducer is configured to emit one or more second beams into the underwater environment, receive second sonar returns from the underwater environment, and convert the second sonar returns into second sonar return data that is used to form a sidescan image of the underwater environment. The system further comprises a sonar signal processor configured to receive the first sonar return data from the first transducer, receive the second sonar return data from the second transducer, generate a downscan sonar image based on the first sonar return data, and generate a sidescan sonar image based on the second sonar return data.

In some embodiments, the second plane and the first plane intersect at the centerline plane. In some embodiments, the second plane is at a non-perpendicular angle with respect to the centerline plane.

BRIEF DESCRIPTION OF THE DRAWINGS

Figure 1:
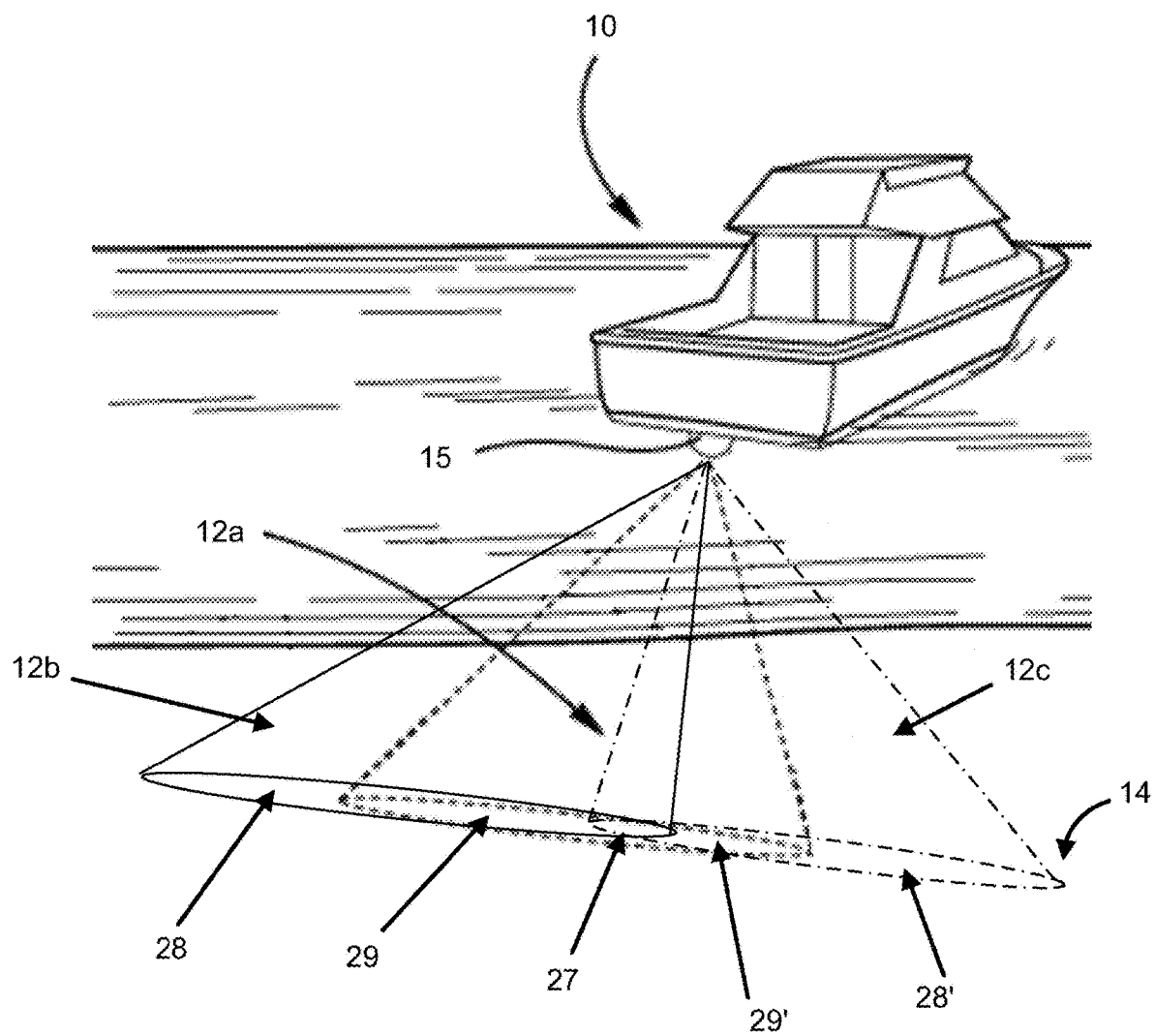
Figure 2:
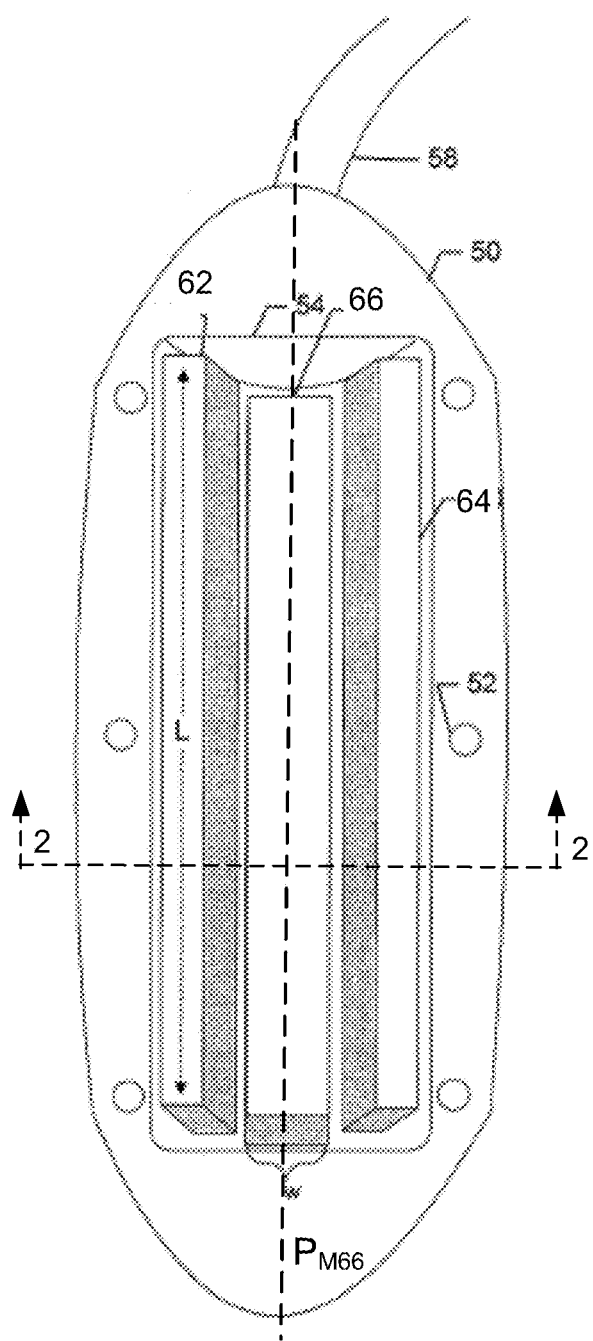
Figure 3:
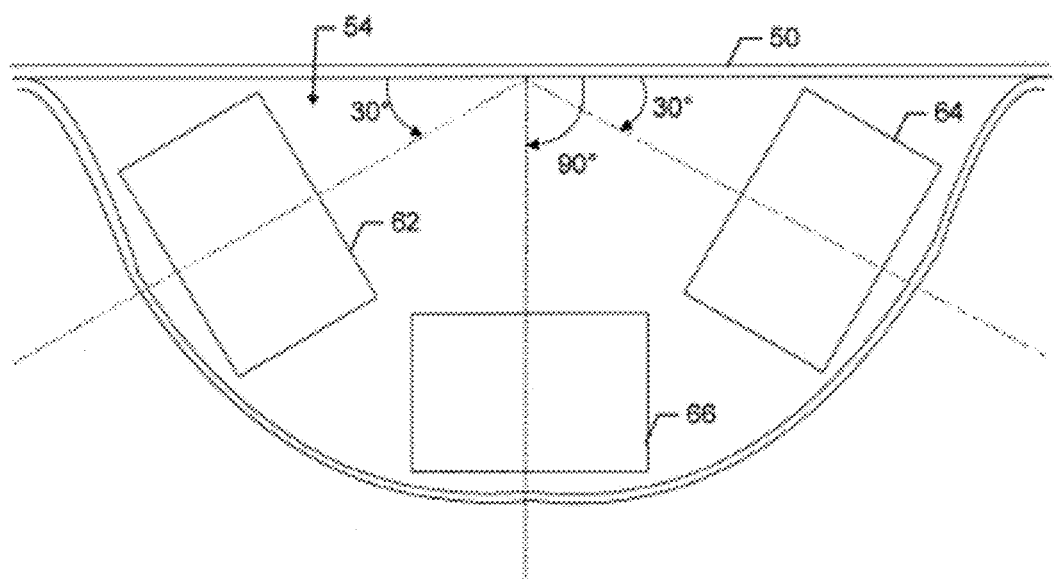
Figure 4:
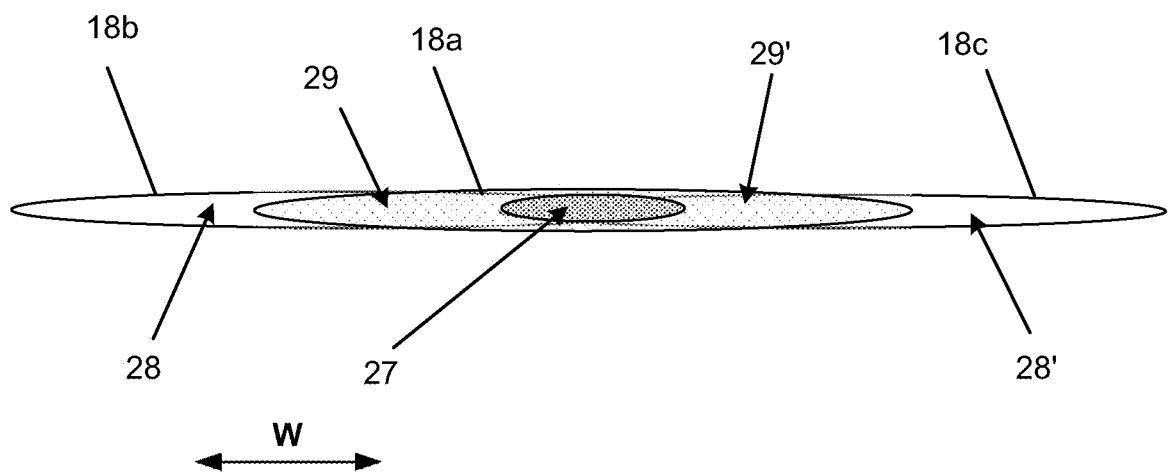
Figure 5:
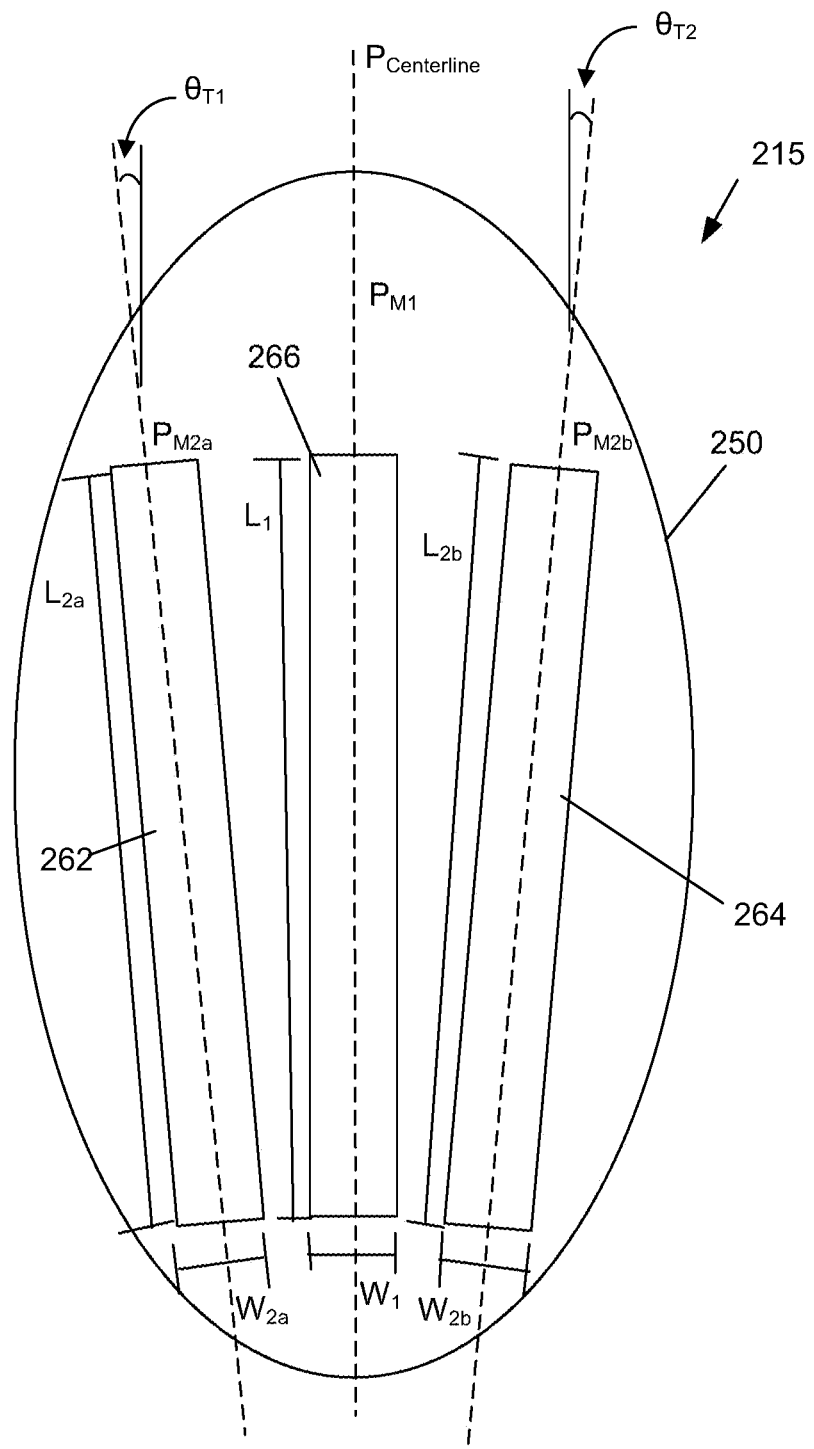
Figure 6:
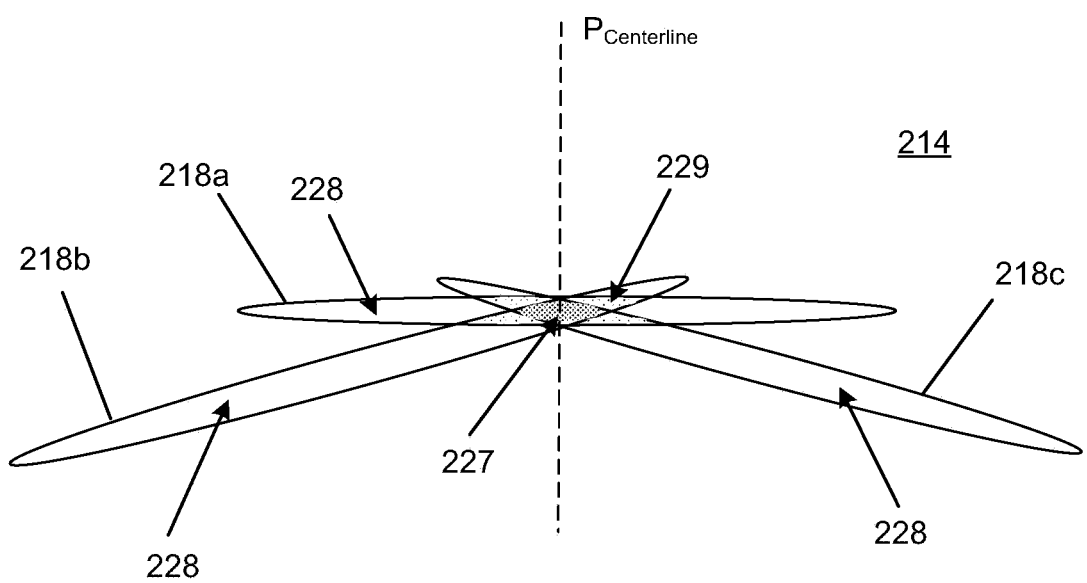
Figure 7:
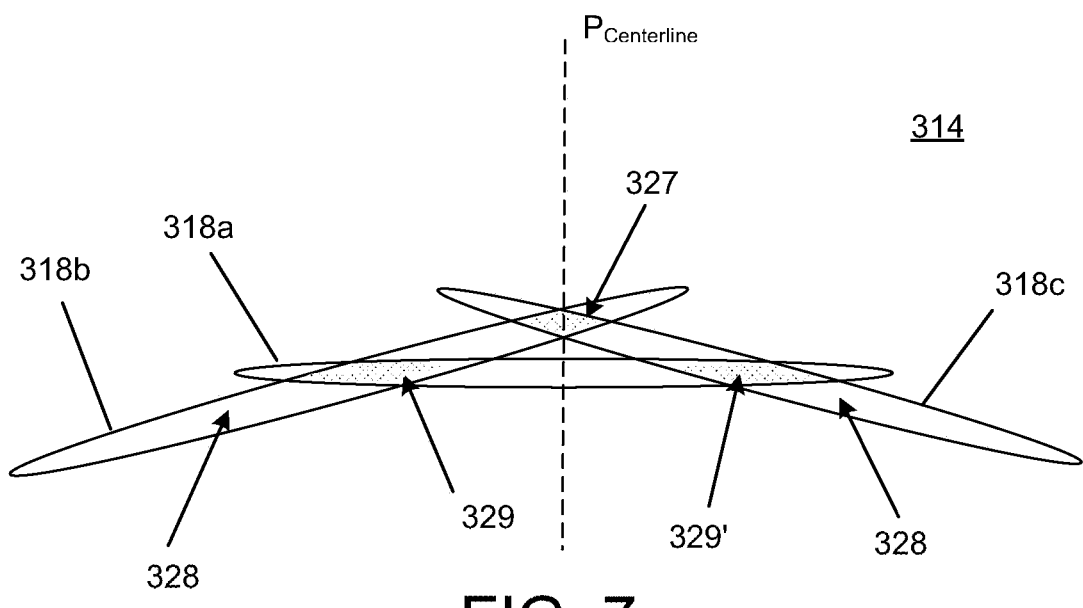
Figure 8:
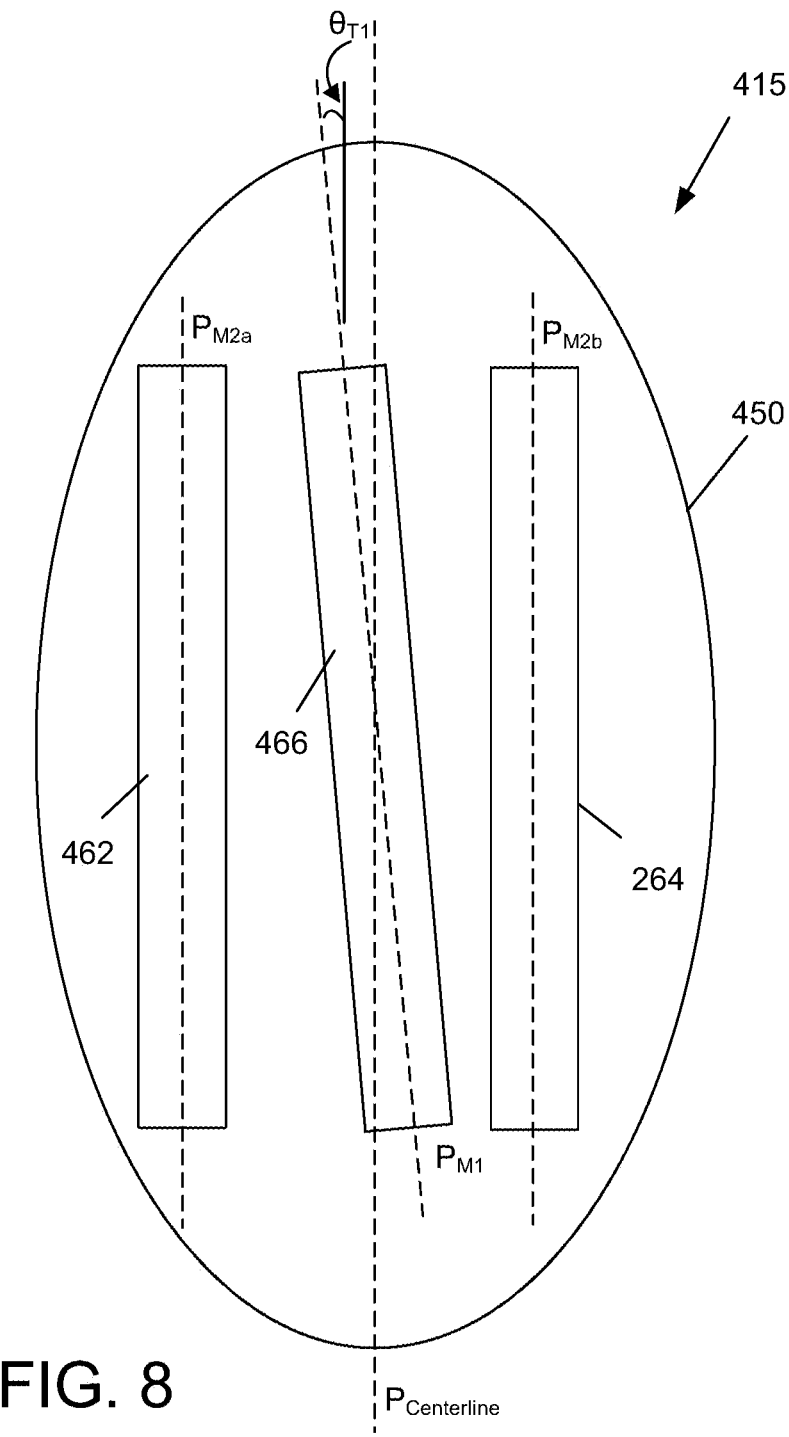
Figure 9:
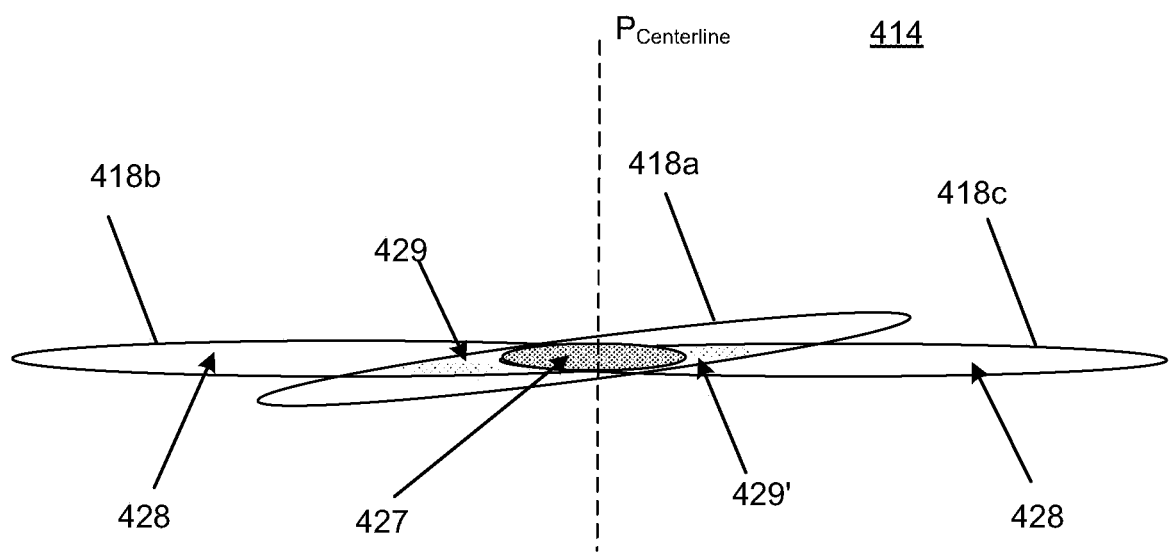
Figure 10A:
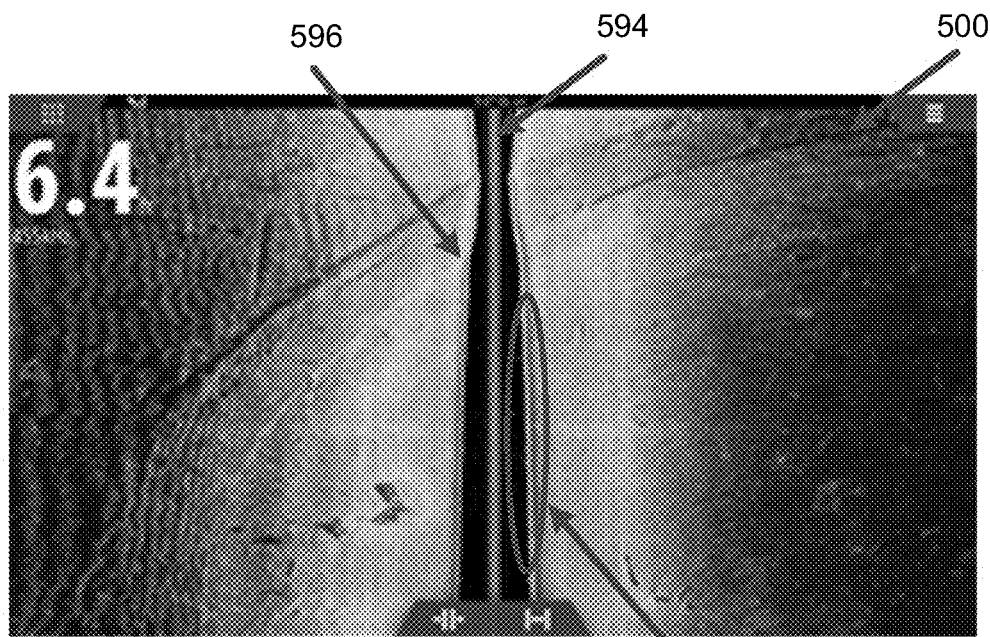
Figure 10B:
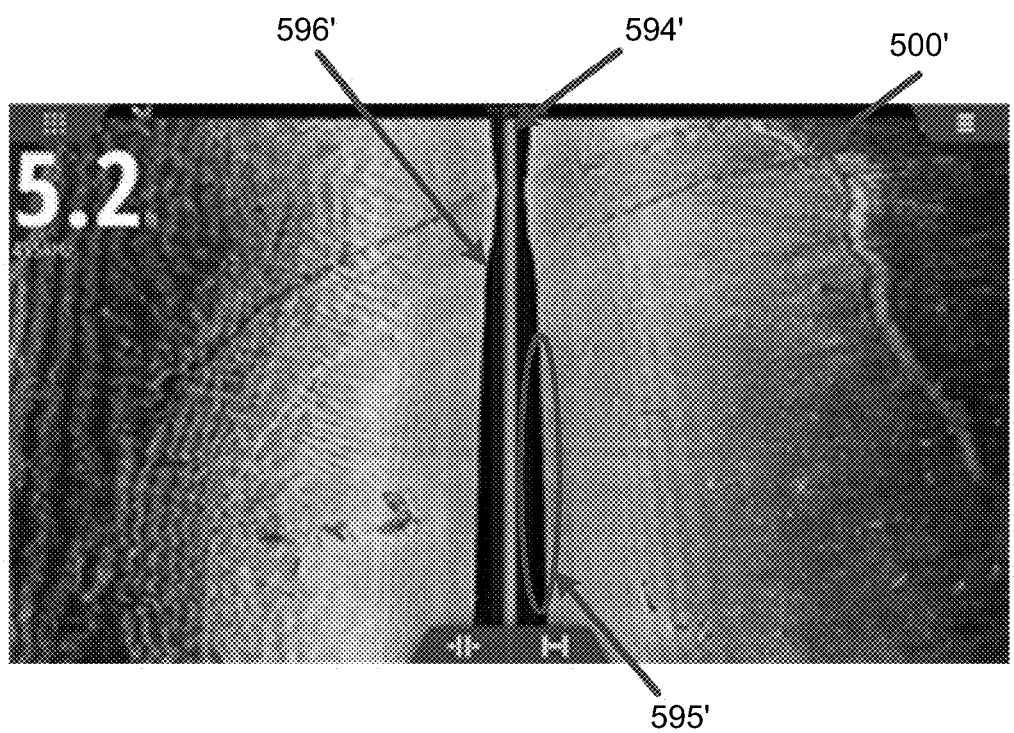
Figure 11:
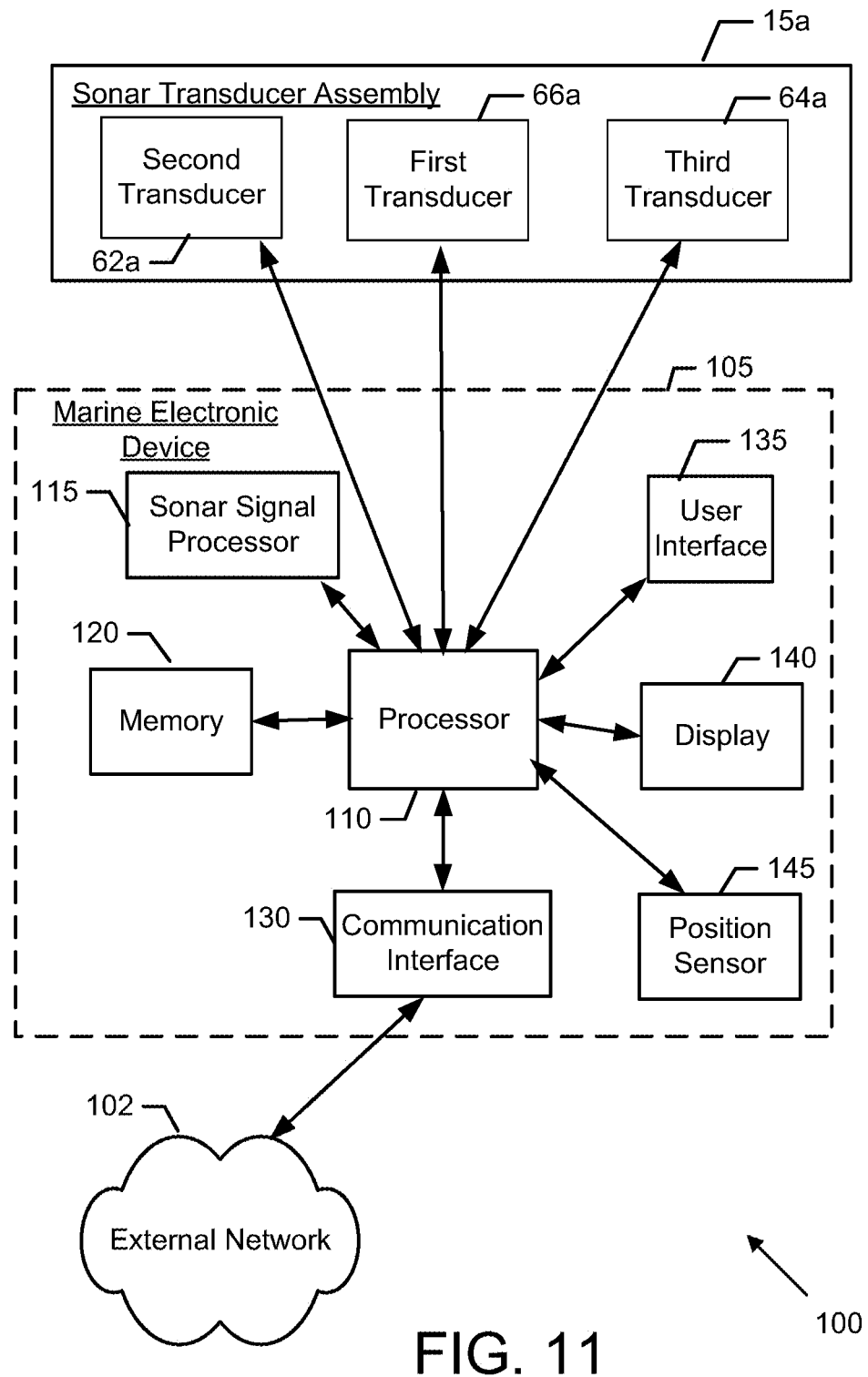
Figure 12:
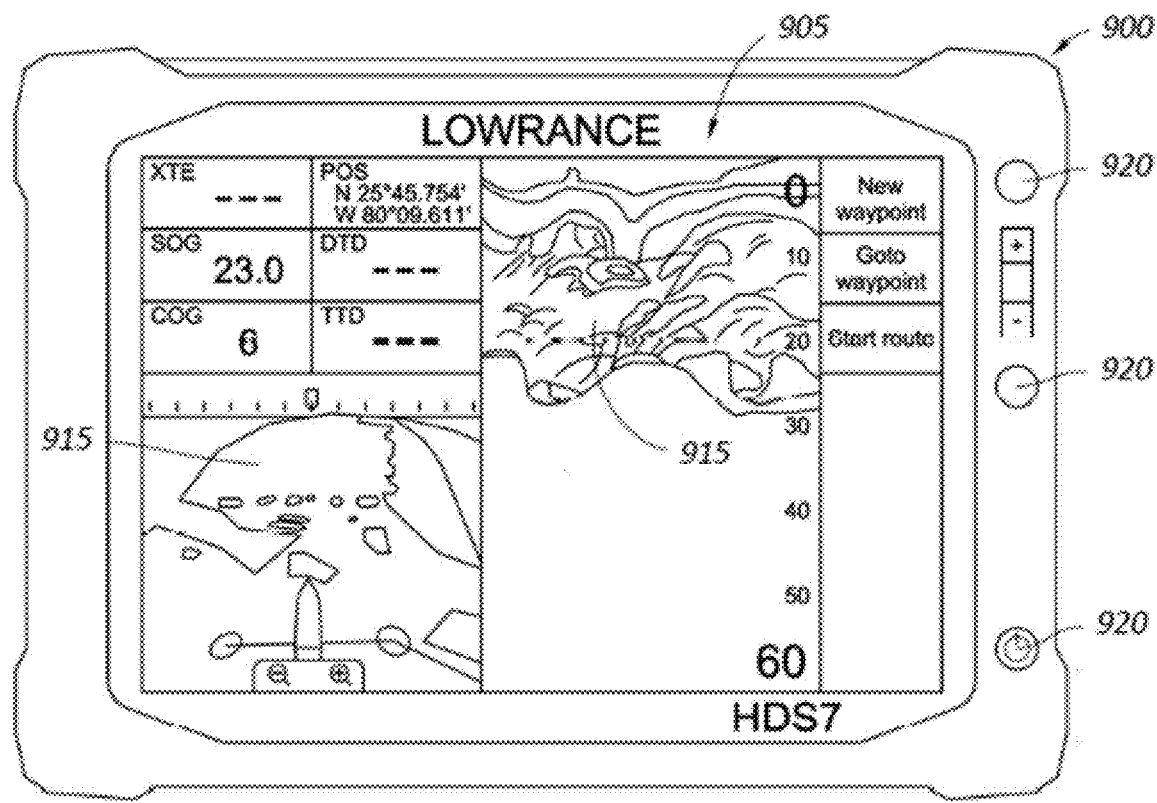

Having thus described the invention in general terms, reference will now be made to the accompanying drawings, which are not necessarily drawn to scale, and wherein:

FIG. 1 illustrates a watercraft with an example traditional sonar transducer assembly emitting three sonar beams, in accordance with some embodiments discussed herein, in accordance with some embodiments discussed herein;

FIG. 2 shows an example traditional sonar transducer assembly, with the transducers mounted in parallel mounting planes, in accordance with some embodiments discussed herein;

FIG. 3 illustrates a cross section of the example traditional sonar transducer assembly shown in FIG. 2, wherein the cross section is taken alone line 2-2 in FIG. 2, with the transducers mounted in parallel mounting planes, in accordance with some embodiments discussed herein;

FIG. 4 illustrates projections of three sonar beams from the example traditional sonar transducer assembly shown in FIG. 2 onto a seafloor, in accordance with some embodiments discussed herein;

FIG. 5 illustrates an example sonar transducer assembly, wherein two sidescan transducers are mounted at a tilted angle with respect to the centerline of the transducer housing, in accordance with some embodiments discussed herein;

FIG. 6 illustrates projections of three sonar beams from the example sonar transducer assembly shown in FIG. 5 onto a seafloor, in accordance with some embodiments discussed herein;

FIG. 7 illustrates projections of three sonar beams from another example sonar transducer assembly onto a seafloor, in accordance with some embodiments discussed herein;

FIG. 8 illustrates another example sonar transducer assembly, wherein the center downscan transducer is mounted at a tilted angle with respect to the centerline of the transducer housing, in accordance with some embodiments discussed herein;

FIG. 9 illustrates projections of three sonar beams from the example sonar transducer assembly shown in FIG. 8 onto a seafloor, in accordance with some embodiments discussed herein;

FIG. 10A illustrates an example sidescan sonar image taken using the traditional sonar transducer assembly shown in FIG. 2, in accordance with some embodiments discussed herein;

FIG. 10B illustrates an example sidescan sonar image taken using the sonar transducer assembly shown in FIG. 5, in accordance with some embodiments discussed herein;

FIG. 11 shows a block diagram illustrating an example sonar system, in accordance with some embodiments discussed herein; and FIG. 12 shows an example marine electronic device, in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Sonar systems (e.g., sonar system 100 in FIG. 11) are commonly employed by boaters, sport fishermen, search and rescue personnel, researchers, surveyors, and others. With reference to FIG. 1, a watercraft 10 may include a sonar system that includes a transducer assembly 15. The transducer assembly 15 can be attached to the watercraft 10 and configured to transmit one or more sonar beams 12a, 12b, 12c (shown based on theoretical −3 dB range) into the underwater environment. Sonar signals from the one or more sonar beams can reflect off objects (such as the seafloor 14 of the body of water, fish, or underwater structures) and return (as sonar returns) to the transducer assembly 15. The transducer assembly 15 (such as through one or more transducers) is configured to convert the sonar returns into electrical energy to form sonar data. This sonar data is received by one or more marine electronic devices (e.g., marine electronic device 105, 900 in FIGS. 11-12) and used to generate an image of the underwater environment (e.g., a sonar image, such as the sidescan sonar images 500, 500' in FIGS. 10A, 10B respectively or downscan sonar images (not shown)) that can be presented on a display (e.g., display 140 in FIG. 11 or screen 905 in FIG. 12).

FIGS. 1-3 illustrate an example traditional sonar transducer assembly 15 that includes multiple transducers positioned within an internal volume 54 of a housing 50. With reference to FIG. 2, the housing 50 may be configured to be mounted to a watercraft or trolling motor (not shown), such as through mounting holes 52 (although other mounting means are contemplated, such as adhesive, fasteners, straps, adjustable mounts and mount adapters, etc.). A cable 58 may enable data (such as sonar return data) to be transmitted to a remotely-located processor, such as the sonar signal processor 115 (shown in FIG. 11) of a marine electronic device 105 of the watercraft 10. In some cases, the marine electronic device 105 may include a display 140 that may, for example, be mounted proximate a helm of the watercraft 10 to enable viewing by the operator of the watercraft 10.

With reference to FIGS. 2-3, the example transducer assembly 15 includes a linear downscan transducer 66 and two linear sidescan transducers 62, 64. The linear downscan transducer 66 is a bar-shaped transducer element that includes a rectangular emitting face (e.g., the face of the element pointing downwardly into the housing 50). Due to the rectangular shape of the emitting face, the resulting emitted sonar beam may define a fan-shape. For example, the sonar beam 12a in FIG. 1 is an example down facing fan-shaped sonar beam (an example −3 dB beam of the 12a sonar beam is indicated using dash-dash lines in FIG. 1). Similarly, the linear sidescan transducers 62, 64 have rectangular emitting faces oriented outwardly and downwardly from respective sides of the housing 50 and corresponding watercraft 10 (or trolling motor (not shown)). For example, FIG. 3 illustrates that a center of the emitting faces of transducer 62 and 64 may be angled at ~30 degrees down from the theoretical surface of the body of water. As a result, the sonar beams 12b and 12c are fan-shaped and generally oriented downwardly and to the sides of the watercraft 10 (an example −3 dB beam corresponding to the 12b sonar beam is shown using solid lines in FIG. 1, whereas an example −3 dB beam corresponding to the 12c sonar beam is shown using dash-dot-dash lines in FIG. 1).

FIG. 4 illustrates projections of the sonar beams emitted from the example transducer assembly 15 onto a seafloor 14. In this regard, the projection 18a corresponds to the sonar beam 12a and, thus, the downscan transducer 66; the projection 18b corresponds to the sonar beam 12b and, thus, the sidescan transducer 62; and the projection 18c corresponds to the sonar beam 12c and, thus, the sidescan transducer 64. Since the transducers are mounted with their lengths, L, in parallel planes (see e.g., FIG. 2), their corresponding sonar beams will project with their widths (e.g., in the width, W, direction on FIG. 4) in the same plane. Notably, the sonar beam emitted from such an example transducer occurs (and extends) in a plane that is perpendicular to the mounting plane of that transducer. For example, consider the difference in orientation of the sonar beam 12a and projection 18a from the mounting plane $P_{M66}$ shown in FIG. 2. Further, depending on the frequency used, and despite being oriented at different angles with respect to the surface of the body of water, the sonar beams 12a, 12b, 12c may likely have portions that overlap. For example, when looking at both FIGS. 1 and 4, an overlap in the projections of 18a and 18b (from sonar beams 12a and 12b) can be seen at 29 (FIG. 4 illustrates the overlap 29 with a slight shading). Likewise, an overlap in the projections of 18a and 18c (from sonar beams 12a and 12c) can be seen at 29' (FIG. 4 illustrates the overlap 29' with a slight shading). Further, an overlap may exist among all three projections 18a, 18b, and 18c (from sonar beams 12a, 12b, and 12c), such as directly underneath the watercraft 10. Such an example overlap can be seen at 27 (FIG. 4 illustrates the overlap 27 with a more dense shading). In this regard, in some cases, there can be no overlap among the projections and corresponding sonar beams (such as shown at 28 and 28').

As noted herein, in some embodiments, sonar return data can be received from the sonar transducers and used, such as by a sonar signal processor 115, to generate one or more sonar images. For example, the downscan transducer 66 may transmit a sonar beam 12a, receive sonar returns from the underwater environment, convert the sonar returns to sonar return data, and transmit the sonar return data to the sonar signal processor for processing and generation of one or more sonar images, such as a downscan sonar image. Likewise, each sidescan transducer 62, 64 may transmit a respective sonar beam 12b, 12c, receive sonar returns from the underwater environment, convert the sonar returns to sonar return data, and transmit the sonar return data to the sonar signal processor for processing and generation of one or more sonar images, such as a sidescan sonar image.

An example sidescan sonar image 500 is shown in FIG. 10A. With reference to the image 500, the sonar image is built up as a "waterfall" moving from top to bottom, with the most recently captured "slice" of sonar imagery at the top and historical "slices" moving down the screen. Further, the "slice" is formed of both sonar return data from the left sidescan transducer 62 starting at the centerline 594 and extending to the left in the image and from the right sidescan transducer 64 starting at the centerline 594 and extending to the right in the image. In this regard, a theoretical position of the watercraft would be at the top in the middle (close to 594). Further, the "bottom" or seafloor then is shown as the line 596 on both the right and left side of the centerline 594 as the sonar image is generated over time.

An example downscan sonar image and additional information regarding similar example sonar transducer assemblies and their features and transducers (and regarding resulting sonar beams, projections, and frequencies) can be found in U.S. patent application Ser. No. 13/301,957, published as U.S. Pat. No. 8,514,658, entitled "Downscan Imaging Sonar For Reduced Interference", which is assigned to Assignee of the present invention and incorporated by reference herein in its entirety.

Returning to FIG. 10A, distortion in the sonar image 500 can occur due to interference between sonar returns from different sonar beams, such as due to various overlaps in beam coverage as detailed herein. For example, a "furrowing" effect can be seen at 595 in the sonar image 500. The "furrowing" effect often gives an impression of a false bottom or false seafloor to the viewer, making it difficult to determine at what depth the bottom really is. Further, the image is less-aesthetically desirable. It has been observed that the overlaps 27, 29, and 29' shown in FIGS. 1 and 4 lead to such interference and the resulting negative effects within the image.

Some embodiments of the present invention seek to minimize interference and provide more accurate and desirable sonar images by angling the mounting planes of some of the transducers within the housing with respect to each other in order to minimize the overlapping of any resulting sonar beams.

FIG. 5 shows an example sonar transducer assembly 215 according to various embodiments of the present invention. The sonar transducer assembly 215 includes a linear downscan transducer 266, a first linear sidescan transducer 262, and a second linear sidescan transducer 264.

The downscan transducer 266 includes a length $L_1$ and a width $W_1$ and is mounted within the housing 250 such that the length $L_1$ extends in a mounting plane $P_{M1}$ that is parallel with a centerline plane $P_{Centerline}$ that corresponds with the centerline of the housing 250 (and, if the housing is so mounted, the centerline of the watercraft or trolling motor). Notably, the mounting plane $P_{M1}$ of the downscan transducer 266 is shown in the same plane as the centerline plane $P_{Centerline}$ in FIG. 5.

The first sidescan transducer 262 includes a length $L_{2a}$ and a width $W_{2a}$ and is mounted within the housing 250 at a first tilted angle $\theta_{T1}$ such that the length $L_{2a}$ extends in a mounting plane $P_{M2a}$ that is non-parallel with the centerline plane $P_{Centerline}$ of the housing 250. In this regard, the mounting plane $P_{M2a}$ of the first sidescan transducer 262 is angularly offset from the mounting plane $P_{M1}$ of the downscan transducer 266. Example embodiments can utilize any non-zero degree amount for the first tilt angle between the mounting plane of the first sidescan transducer and the centerline plane. For example, the first tilt angle may be 1 degree, 2 degrees, 1.5 degrees, 10 degrees, etc. In an exemplary embodiment, the first tilt angle is between 2 degrees and 4 degrees.

The second sidescan transducer 264 includes a length $L_{2b}$ and a width $W_{2b}$ and is mounted within the housing 250 at a second tilted angle $\theta_{T2}$ such that the length $L_{2b}$ extends in a mounting plane $P_{M2b}$ that is non-parallel with the centerline plane $P_{Centerline}$ of the housing 250. In this regard, the mounting plane $P_{M2b}$ of the second sidescan transducer 264 is angularly offset from the mounting plane $P_{M1}$ of the downscan transducer 266. Similar to the first tilt angle, example embodiments can utilize any non-zero degree amount for the second tilt angle between the mounting plane of the second sidescan transducer and the centerline plane. For example, the second tilt angle may be 1 degree, 2 degrees, 1.5 degrees, 10 degrees, etc. In an exemplary embodiment, the second tilt angle is between 2 degrees and 4 degrees.

In some embodiments, the first sidescan transducer 262 and the second sidescan transducer 264 may be mounted in corresponding mounting planes that are symmetrically offset from the centerline plane $P_{Centerline}$ with respect to each other. For example, they may both be offset at the same amount of degrees for the tilt angle with respect to the centerline plane $P_{Centerline}$, but just in different angular directions. For example, the first sidescan transducer 262 may be offset at a first tilt angle $\theta_{T1}$ of 2 degrees in the counterclockwise direction from the centerline plane $P_{Centerline}$, whereas the second sidescan transducer 264 may be offset at a second tilt angle $\theta_{T2}$ of 2 degrees in the clockwise direction from the centerline plane $P_{Centerline}$.

Such an example embodiment may, for example, provide for uniform sonar return data with respect to the sidescan sonar imagery data.

FIG. 6 illustrates projections of the sonar beams emitted from the example transducer assembly 215 onto a seafloor 214. In this regard, the projection 218a corresponds to the sonar beam formed from the downscan transducer 266; the projection 218b corresponds to the sonar beam formed from the first sidescan transducer 262; and the projection 218c corresponds to the sonar beam formed from the second sidescan transducer 264. Notably, since the projections 218a, 218b, and 218c all extend in different planes (e.g., since their corresponding transducers are mounted in different planes), there is only minimal overlap. For example, projections 218b and 218c each extend in a corresponding plane that is non-perpendicular to the centerline plane, whereas the projection 218a is in a plane that does extend perpendicularly to the centerline plane.

In some embodiments, the projections may extend with various portions crossing the centerline plane. For example, a width of the first sonar beam (e.g., projection 218a) extends to the left and to the right of the centerline plane, and at least a portion of a width of each of the second sonar beam (e.g., projection 218b) and the third sonar beam (projection 218c) extends across the centerline plane.

Due to the tilted angles of the mountings of the first and second transducers 262, 264 there is a central overlap 227 where all three projections overlap. This central overlap 227 may, in some embodiments, correspond to directly below the watercraft at or near its centerline (e.g., the centerline plane). In this regard, the sonar beams may be designed to intersect at or near the centerline plane. In some embodiments, intersection (and the resulting overlap) may be designed at the centerline plane of the transducer housing (and watercraft/trolling motor) in order to ensure a common and consistent bottom depth between the sidescan transducers (and, in some cases, the downscan transducer) where the desired depth reading is coming from directly beneath the watercraft or trolling motor (which may be a depth that the user cares particularly about).

Other overlap (e.g., overlap areas 229) between, for example, one of the sidescan projections and the downscan projection may still occur in various areas of the seafloor. For example, a larger portion of the projection 218b may overlap with the projection 218a than is included in the central overlap 227. Although the term "central" overlap is used herein, in some embodiments, the overlap area for all three (or more) projections may not be centrally located with respect to the transducer housing and/or watercraft/trolling motor centerline. For example, the overlap 227 may be designed to be offset for one or more reasons, such as focusing on a desired position beneath the transducer housing and/or watercraft/trolling motor.

Notably, as illustrated in FIG. 6, the projections 218a, 218b, and 218c all include substantial non-overlapping area 228. Accordingly, there is less interference between the sonar beams, thereby resulting in improved sonar images. For example, FIG. 10B shows a sidescan sonar image 500' taken using the example sonar transducer assembly 215. Notably, the bottom 596' shown in the image 500' does not include the "furrowing" effect or false bottom that was seen in the sidescan sonar image 500 of FIG. 10A taken using the example sonar transducer assembly 15 (e.g., compare the bottom within area 595' of FIG. 10B versus the bottom within area 595 of FIG. 10A). In this regard, the minimized overlap resulted in removal of the interference that caused the "furrowing" effect—thereby enabling formation of a more clear sidescan sonar image.

The above example provides just one example of the beneficial effects of reduced interference by minimizing the overlap between the multiple transducers in a sonar transducer assembly using tilted angle mounting. Embodiments of the present invention envision other benefits, such as for other images (e.g., downscan images, 3D sonar images, etc.).

Further, though the example described and shown embodiments herein detail three linear transducers (one downscan and two opposing sidescan), any number or type of transducers may be utilized with the invention contemplated herein. For example, one or more sidescan transducers may be replaced with multiple sidescan transducers, such as to form an array. In such an example, one or more (e.g., all) of the transducers within the array may be mounted at the tilted angle to gain the desired benefits of reduced interference. The same or similar configuration could also apply for the downscan or other sidescan transducer.

Along similar lines, more or less than three transducers (or corresponding arrays) may be utilized according to various embodiments of the present invention. For example, two transducers, such as a downscan transducer and a sidescan transducer may be utilized in an example sonar transducer assembly (such as just downscan transducer 266 and first sidescan transducer 262). In such embodiments, the downscan transducer and the sidescan transducer may maintain different mounting angles (such as employing a tilt angle for either or both of them) in order to minimize overlap. In some embodiments, though not shown, the sidescan transducers may have different mounting angles with respect to each other. For example, one may have a mounting angle parallel to the centerline plane, and the other may be mounted using the tilt angle, such that there is minimal overlap between the two resulting sonar beams.

In some embodiments, other configurations of sonar transducer assemblies are contemplated with the present invention. For example, forwardscan transducer(s), downscan transducer(s), sidescan transducer(s), rotating transducer(s), phased array transducer(s), beamforming transducer(s), among any others can be utilized. In this regard, in some embodiments, employing a tilt angle for mounting one or more of the transducers may reduce interference for the sonar transducer assembly and result in improved sonar imagery and performance.

Further, other types and shapes of transducers are also contemplated, such as may form elliptical or rectangular shaped sonar beams. In this regard, tilt angle mounting may be utilized to limit overlap among proximate sonar beams, similar to what is described herein with respect to fan-shaped beams.

Likewise, though the above described embodiment provides an overlap or intersection along the centerline plane, the transducer assembly may be designed to have the overlap occur outside of the centerline plane.

As noted herein, some embodiments of the present invention contemplate changing a mounting plane (such as via a tilt angle with respect to the centerline plane) in order to achieve reduced interference between multiple transducers. Notably, depending on the tilt angle chosen, if the angle is small, the overlap may be minimized, but any negative effects of the changed angle may also be minimized. For example, the projection 218c is designed to capture sonar returns from a side of the watercraft/trolling motor. If too large of a tilt angle is used, then the sonar beam may not extend in a direction/volume that provides desired sonar imagery (e.g., the sonar beam may not provide sonar imagery corresponding to what is actually to the side of the watercraft/trolling motor—as it could correspond to more of what is behind or ahead of the watercraft/trolling motor). Thus, it may, in some cases, be desirable to keep a lower tilt angle (e.g., between 2-4 degrees) to ensure that the sonar beam extends in an appropriate direction/volume while still minimizing overlap and reducing interference.

FIG. 7 illustrates projections of sonar beams emitted from another example sonar transducer assembly onto a seafloor 314, wherein projection 318a corresponds to a downscan transducer, projection 318b corresponds to a first sidescan transducer, and projection 318c corresponds to a second sidescan transducer. Notably, in such an example sonar transducer assembly, the mounted position of the first and second sidescan transducer within the housing is moved forward from that in the sonar transducer assembly 215. To explain, a center of the first and second sidescan transducers has been moved forward within the housing with respect to a center of the downscan transducer such that the longitudinal positions of the mountings of the sidescan transducers are offset from the mounting of the downscan transducer. In this regard, the corresponding projections appear differently on the seafloor 314 than in FIG. 6, with the intersections among them being different. With reference to FIG. 7, projections 318b (from the first sidescan transducer) and 318c (from the second sidescan transducer) overlap at 327 which is forward of the entire projection 318a (from the downscan transducer). As shown, the overlap 327 still occurs along the centerline plane $P_{Centerline}$. Additionally, projection 318b overlaps at 329 with projection 318a, but to the left of the centerline plane $P_{Centerline}$. Likewise, projection 318c overlaps at 329' with projection 318a, but to the right of the centerline plane $P_{Centerline}$. Such an example embodiment illustrates that the relative positions of the transducers within the sonar transducer assembly may also be changed with respect to each other, which may, in some cases, be useful for configuring/determining where the overlap and corresponding interference may occur—thereby enabling minimization and/or control of the interference.

FIGS. 8-9 illustrate another example variant of a sonar transducer assembly contemplated by embodiments of the present invention. Notably, the sonar transducer assembly 415 includes a downscan transducer 466 that is mounted in a mounting plane $P_{M1}$ within the housing 450 that is at a tilted angle $\theta_{T1}$ from the centerline plane $P_{Centerline}$, while the first and second transducers 462, 464 are mounted in mounting planes $P_{M2a}$ and $P_{M2b}$, respectively, within the housing 450 that are parallel to the centerline plane $P_{Centerline}$. Correspondingly, FIG. 9 illustrates projections of sonar beams emitted from the sonar transducer assembly 415 onto a seafloor 414, wherein projection 418a corresponds to the downscan transducer 466, projection 418b corresponds to the first sidescan transducer 462, and projection 418c corresponds to the second sidescan transducer 464.

With reference to FIG. 9, since the downscan transducer 466 is mounted at a tilted angle with respect to the centerline plane $P_{Centerline}$ and the mounting planes $P_{M2a}$ and $P_{M2b}$ of the first and second transducer 462, 464, the corresponding projection 418a is skewed (or tilted) with respect to projections 418b and 418c. As such, overlap of all three projections is minimized to area 427 and there is minimized overlap 429, 429' of the downscan projection 418a with each of the sidescan projections 418b and 418c—thereby reducing interference in corresponding sonar images generated from the example sonar transducer assembly 415.

As indicated by the various example sonar transducer assemblies described herein, embodiments of the present invention contemplate many different configurations of tilted angle mounting and positioning of the transducers within the housing to achieve reduced interference.

Example System Architecture

FIG. 11 shows a block diagram of an example sonar system 100 capable for use with several embodiments of the present invention. As shown, the sonar system 100 may include a number of different modules or components, each of which may comprise any device or means embodied in either hardware, software, or a combination of hardware and software configured to perform one or more corresponding functions. For example, the sonar system 100 may include a transducer assembly 15a and a marine electronic device 105. An example marine electronic device is shown in FIG. 12.

With continued reference to FIG. 11, the sonar system 100 may also include one or more communications modules configured to communicate with one another in any of a number of different manners including, for example, via a network. In this regard, the communications interface 130 may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g., a marine electronic device 105) may be included in the sonar system 100.

The marine electronic device 105 may include a processor 110, a sonar signal processor 115, a memory 120, a user interface 135, a display 140, one or more sensors (e.g., position sensor 145, orientation sensor (not shown), etc.), and a communication interface 130. Two or more of the components may be integrated into a single module or component (e.g., the display 140 may also be a touchscreen user interface 135).

The processor 110, which may also operate as a sonar signal processor, or which may include or be operatively connected to a sonar signal processor 115, may be any means configured to execute various programmed operations or instructions stored in a memory device such as a device or circuitry operating in accordance with software or otherwise embodied in hardware or a combination of hardware and software (e.g., a processor or microprocessor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide sonar data indicative of the size, location, shape, etc. of objects detected by the sonar system 100. For example, the processor 110 may be configured to receive sonar return data and process the sonar return data to generate sonar image data for display to a user (e.g., on display 140).

In some embodiments, the processor 110 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. In some embodiments, the processor 110 and/or sonar signal processor 115 may include or be connected to an analog/digital converter.

The memory 120 may be configured to store instructions, computer program code, marine data, such as sonar data, chart data, location/position data, and other data associated with the sonar system in a non-transitory computer readable medium for use, such as by the processor.

The communication interface 130 may be configured to enable connection to external systems (e.g., an external network 102). In this manner, the marine electronic device 105 may retrieve stored data from a remote, external server via the external network 102 in addition to or as an alternative to the onboard memory 120.

The position sensor 145 may be configured to determine the current position and/or location of the marine electronic device 105. For example, the position sensor 145 may comprise a GPS or other location detection system.

The display 140 may be configured to display images and may include or otherwise be in communication with a user interface 135 configured to receive an input from a user. The display 140 may be, for example, a conventional LCD (liquid crystal display), a touch screen display, mobile device, or any other suitable display known in the art upon which images may be displayed.

In any of the embodiments, the display 140 may present one or more sets of marine data (or images generated from the one or more sets of data). Such marine data includes chart data, radar data, weather data, location data, position data, orientation data, sonar data, or any other type of information relevant to the watercraft. In some embodiments, the display may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, the sonar image may be applied to (or overlaid onto) a chart (e.g., a map or navigational chart). Additionally or alternatively, depth information, weather information, radar information, or any other sonar system inputs may be applied to one another.

The user interface 135 may include, for example, a keyboard, keypad, function keys, mouse, scrolling device, input/output ports, touch screen, or any other mechanism by which a user may interface with the system.

Although the display 140 of FIG. 11 is shown as being directly connected to the processor 110 and within the marine electronic device 105, the display 140 could alternatively be remote from the processor 110 and/or marine electronic device 105. Likewise, in some embodiments, the sonar signal processor 115, the position sensor 145, and/or user interface 135 could be remote from the marine electronic device 105.

The transducer assembly 15a according to an example embodiment may be provided in one or more housings that provide for flexible mounting options with respect to the watercraft. In this regard, for example, the housing may be mounted onto the hull of the watercraft or onto a device or component that may be attached to the hull (e.g., a trolling motor or other steerable device, or another component that is mountable relative to the hull of the vessel), including a bracket that is adjustable on multiple axes, permitting omni-directional movement of the housing.

The transducer assembly 15a may include two or more transducers or transducer elements positioned within the housing, such as described herein (e.g., a first (downscan) transducer 66a; a second (sidescan) transducer 62a; and a third (sidescan transducer 64a). In some embodiments, the transducer 15a may include or be connected to a power amplifier that charges a burst of power for each transmitted sonar beam. Each sonar beam may be a burst of sonar signal at a predetermined frequency and having a non-zero duration. Each transducer may be configured as transmit/receive, transmit-only, or receive-only with respect to transmitting one or more sonar beams and receiving sonar returns.

In some embodiments, each of the transducer elements may be positioned within the housing so as to point toward a predetermined area under, to the side, or the front of the watercraft. The shape of a transducer element may largely determine the type of beam that is formed when that transducer element transmits a sonar pulse (e.g., a circular transducer element emits a cone-shaped beam, a linear transducer emits a fan-shaped beam, etc.). Unless otherwise stated, embodiments of the present invention are not limited to any particular shape of transducer. Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Further, transducers may configured to transmit and/or receive at different frequencies. In this regard, embodiments of the present invention are not meant to be limited to certain frequencies.

Additionally, in some embodiments, the transducer assembly 15a may have a sonar signal processor (e.g., sonar signal processor 115) and/or other components positioned within the housing. For example, one or more transceivers (e.g., transmitter/receiver), transmitters, and/or receivers may be positioned within the housing and configured to cause the one or more transducers to transmit sonar beams and/or receive sonar returns from the one or more transducers. In some embodiments, the sonar signal processor, transceiver, transmitter, and/or receiver may be positioned in a separate housing.

With reference to FIG. 12, an example marine electronic device 900 is shown. The marine electronic device 900 may include a screen 905 and may have one or more buttons 920 and/or a touchscreen for controlling the sonar system. The marine electronic device 900 may display marine electronic data 915 such as sonar data or other features and functions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A sonar transducer assembly for reduced interference, the sonar transducer assembly comprising:
   a housing configured to be mounted to a watercraft or a trolling motor;
   a first transducer element positioned within the housing and aimed generally downward of the watercraft or the trolling motor when the housing is mounted to the watercraft or the trolling motor, wherein the first transducer element:
     defines a rectangular emitting face with a length and a width;
     is positioned within the housing such that the length of the first transducer element is configured to extend parallel to a centerline plane that includes a centerline of the watercraft or the trolling motor, wherein the centerline runs along the fore-to-aft direction of the watercraft or the trolling motor; and
     is configured to produce a first beam defining a fan-shape and generally extending in a first plane;
   a second transducer element positioned within the housing and aimed generally downwardly and to a first side of the watercraft or the trolling motor when the housing is mounted to the watercraft or the trolling motor, wherein the second transducer element:
     defines a rectangular emitting face with a length and a width;
     is configured to produce a second beam defining a fan-shape and generally extending in a second plane; and
     is positioned at a tilted angle within the housing such that the length of the second transducer element is configured to extend in a first mounting plane that is non-parallel to the centerline plane, wherein the first mounting plane is offset from the centerline plane by at least 1 degree such that the second plane is not parallel to the first plane so as to reduce interference between the first transducer element and the second transducer element; and
   a third transducer element positioned within the housing and aimed generally downwardly and to a second side of the watercraft or the trolling motor when the housing is mounted to the watercraft or the trolling motor, wherein the second side is opposite the first side, wherein the third transducer element:
     defines a rectangular emitting face with a length and a width;
     is configured to produce a third beam defining a fan-shape and generally extending in a third plane; and
     is positioned at a second tilted angle within the housing such that the length of the third transducer element is configured to extend in a second mounting plane that is non-parallel to the centerline plane, wherein the second mounting plane is offset from the centerline plane by at least 1 degree such that the third plane is not parallel to the first plane so as to reduce interference between the first transducer element and the third transducer element;
   wherein the first beam, the second beam, and the third beam all intersect in an overlap region.

2. The sonar transducer assembly of claim 1, wherein the second plane and the first plane intersect along a first vertical line, and wherein the third plane and the first plane intersect along a second vertical line.

3. The sonar transducer assembly of claim 1, wherein the third plane, the second plane, and the first plane intersect at the centerline plane to form a central overlap region.

4. The sonar transducer assembly of claim 1, wherein the second plane is at a non-perpendicular angle with respect to the centerline plane.

5. The sonar transducer assembly of claim 1, wherein a width of the first beam extends to a left and to a right of the centerline plane, and wherein at least a portion of a width of the second beam extends across the centerline plane.

6. The sonar transducer assembly of claim 1, wherein the tilted angle is between 2 degrees and 4 degrees of offset from the centerline plane.

7. The sonar transducer assembly of claim 1, wherein the first transducer element is configured to:
   emit one or more first beams into an underwater environment;
   receive first sonar returns from the underwater environment; and
   convert the first sonar returns into first sonar return data that is used to form a downscan image of the underwater environment.

8. The sonar transducer assembly of claim 7, wherein the second transducer element is configured to:
   emit one or more second beams into the underwater environment;
   receive second sonar returns from the underwater environment; and
   convert the second sonar returns into second sonar return data that is used to form a sidescan image of the underwater environment.

9. The sonar transducer assembly of claim 1, wherein the second mounting plane is non-parallel to the first mounting plane.

10. The sonar transducer assembly of claim 9, wherein the second tilted angle corresponding to the second mounting plane is offset from the centerline plane a same degree as the tilted angle corresponding to the first mounting plane such that the third plane and the second plane are symmetrical with respect to the centerline plane.

11. A sonar transducer assembly for reduced interference, the sonar transducer assembly comprising:
   a housing configured to be mounted to a watercraft or a trolling motor;
   a first transducer element positioned within the housing and aimed generally downwardly and to a first side of the watercraft or the trolling motor when the housing is mounted to the watercraft or the trolling motor, wherein the first transducer element:
     defines a rectangular emitting face with a length and a width;
     is positioned within the housing such that the length of the first transducer element is configured to extend parallel to a centerline plane that includes a centerline of the watercraft or the trolling motor, wherein the centerline runs along the fore-to-aft direction of the watercraft or the trolling motor; and
     is configured to produce a first beam defining a fan-shape and generally extending in a first plane;
   a second transducer element positioned within the housing and aimed generally downward of the watercraft or the trolling motor when the housing is mounted to the watercraft or the trolling motor, wherein the second transducer element:
- defines a rectangular emitting face with a length and a width;
- is configured to produce a second beam defining a fan-shape and generally extending in a second plane; and
- is positioned at a tilted angle within the housing such that the length of the second transducer element is configured to extend in a first mounting plane that is non-parallel to the centerline plane, wherein the first mounting plane is offset from the centerline plane by at least 1 degree such that the second plane is not parallel to the first plane so as to reduce interference between the first transducer element and the second transducer element; and a third transducer element positioned within the housing and aimed generally downwardly and to a second side of the watercraft or the trolling motor when the housing is mounted to the watercraft or the trolling motor, wherein the second side is opposite the first side, wherein the third transducer element:
- defines a rectangular emitting face with a length and a width;
- is configured to produce a third beam defining a fan-shape and generally extending in a third plane; and
- is positioned at a second tilted angle within the housing such that the length of the third transducer element is configured to extend in a second mounting plane that is non-parallel to the centerline plane, wherein the second mounting plane is offset from the centerline plane by at least 1 degree such that the third plane is not parallel to the first plane so as to reduce interference between the first transducer element and the third transducer element;

wherein the first beam, the second beam, and the third beam all intersect in a central overlap region.

12. The sonar transducer assembly of claim 11, wherein the second plane and the first plane intersect along a vertical line.

13. The sonar transducer assembly of claim 11, wherein the second plane is at a non-perpendicular angle with respect to the centerline plane.

14. A sonar transducer assembly for reduced interference, the sonar transducer assembly comprising:
- a housing configured to be mounted to a watercraft or a trolling motor;
- a first transducer element positioned within the housing and aimed generally downward of the watercraft or the trolling motor when the housing is mounted to the watercraft or the trolling motor, wherein the first transducer element:
  - defines a rectangular emitting face with a length and a width;
  - is positioned within the housing such that the length of the first transducer element is configured to extend in a first mounting plane; and
  - is configured to produce a first beam defining a fan-shape and generally extending in a first plane;
- a second transducer element positioned within the housing and aimed generally downwardly and to a first side of the watercraft or the trolling motor when the housing is mounted to the watercraft or the trolling motor, wherein the second transducer element:
  - defines a rectangular emitting face with a length and a width;
  - is configured to produce a second beam defining a fan-shape and generally extending in a second plane; and
  - is positioned at a tilted angle within the housing such that the length of the second transducer element is configured to extend in a second mounting plane that is non-parallel to the first mounting plane, wherein the second mounting plane is offset from the first mounting plane by at least 1 degree such that the second plane is not parallel to the first plane so as to reduce interference between the first transducer element and the second transducer element; and
- a third transducer element positioned within the housing and aimed generally downwardly and to a second side of the watercraft or the trolling motor when the housing is mounted to the watercraft or the trolling motor, wherein the second side is opposite the first side, wherein the third transducer element:
  - defines a rectangular emitting face with a length and a width;
  - is configured to produce a third beam defining a fan-shape and generally extending in a third plane; and
  - is positioned at a second tilted angle within the housing such that the length of the third transducer element is configured to extend in a third mounting plane that is non-parallel to the first mounting plane, wherein the third mounting plane is offset from the first mounting plane by at least 1 degree such that the third plane is not parallel to the first plane so as to reduce interference between the first transducer element and the third transducer element;

wherein the first beam, the second beam, and the third beam all intersect in an overlap region.

15. The sonar transducer assembly of claim 14, wherein the third plane, the second plane, and the first plane intersect at a centerline plane that includes a centerline of the watercraft or the trolling motor.

16. A sonar system for reduced interference for imaging an underwater environment, the sonar system comprising:
- a sonar transducer assembly comprising:
  - a housing configured to be mounted to a watercraft or a trolling motor;
  - a first transducer element positioned within the housing and aimed generally downward of the watercraft or the trolling motor when the housing is mounted to the watercraft or the trolling motor, wherein the first transducer element:
    - defines a rectangular emitting face with a length and a width;
    - is positioned within the housing such that the length of the first transducer element is configured to extend parallel to a centerline plane that includes a centerline of the watercraft or the trolling motor, wherein the centerline runs along the fore-to-aft direction of the watercraft or the trolling motor;
    - is configured to produce a first beam defining a fan-shape and generally extending in a first plane; and
    - is configured to emit one or more first beams into the underwater environment, receive first sonar returns from the underwater environment, and convert the first sonar returns into first sonar return data that is used to form a downscan image of the underwater environment;
  - a second transducer element positioned within the housing and aimed generally downwardly and to a first side of the watercraft or the trolling motor when the housing is mounted to the watercraft or the trolling motor, wherein the second transducer element:
  defines a rectangular emitting face with a length and a width;
  is configured to produce a second beam defining a fan-shape and generally extending in a second plane;
  is positioned at a tilted angle within the housing such that the length of the second transducer element is configured to extend in a first mounting plane that is non-parallel to the centerline plane, wherein the first mounting plane is offset from the centerline plane by at least 1 degree such that the second plane is not parallel to the first plane so as to reduce interference between the first transducer element and the second transducer element; and
  is configured to emit one or more second beams into the underwater environment, receive second sonar returns from the underwater environment, and convert the second sonar returns into second sonar return data that is used to form a sidescan image of the underwater environment;
a third transducer element positioned within the housing and aimed generally downwardly and to a second side of the watercraft or the trolling motor when the housing is mounted to the watercraft or the trolling motor, wherein the second side is opposite the first side, wherein the third transducer element:
  defines a rectangular emitting face with a length and a width;
  is configured to produce a third beam defining a fan-shape and generally extending in a third plane; and
  is positioned at a second tilted angle within the housing such that the length of the third transducer element is configured to extend in a second mounting plane that is non-parallel to the centerline plane, wherein the second mounting plane is offset from the centerline plane by at least 1 degree such that the third plane is not parallel to the first plane so as to reduce interference between the first transducer element and the third transducer element;
wherein the first beam, the second beam, and the third beam all intersect in an overlap region; and
a sonar signal processor configured to:
  receive the first sonar return data from the first transducer element;
  receive the second sonar return data from the second transducer element;
  generate a downscan sonar image based on the first sonar return data; and
  generate a sidescan sonar image based on the second sonar return data.

17. The sonar system of claim 16, wherein the third plane, the second plane, and the first plane intersect at the centerline plane to form a central overlap region.

18. The sonar system of claim 16, wherein the second plane is at a non-perpendicular angle with respect to the centerline plane.

* * * * *